Figure 4:
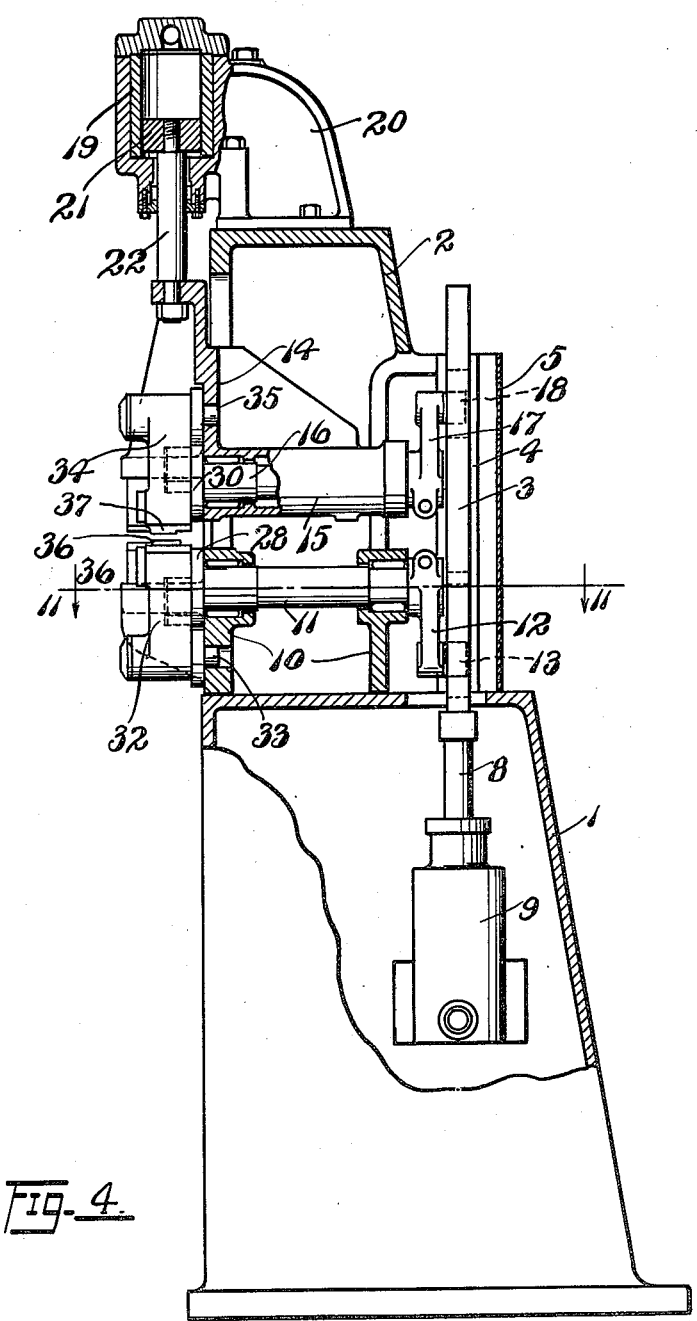

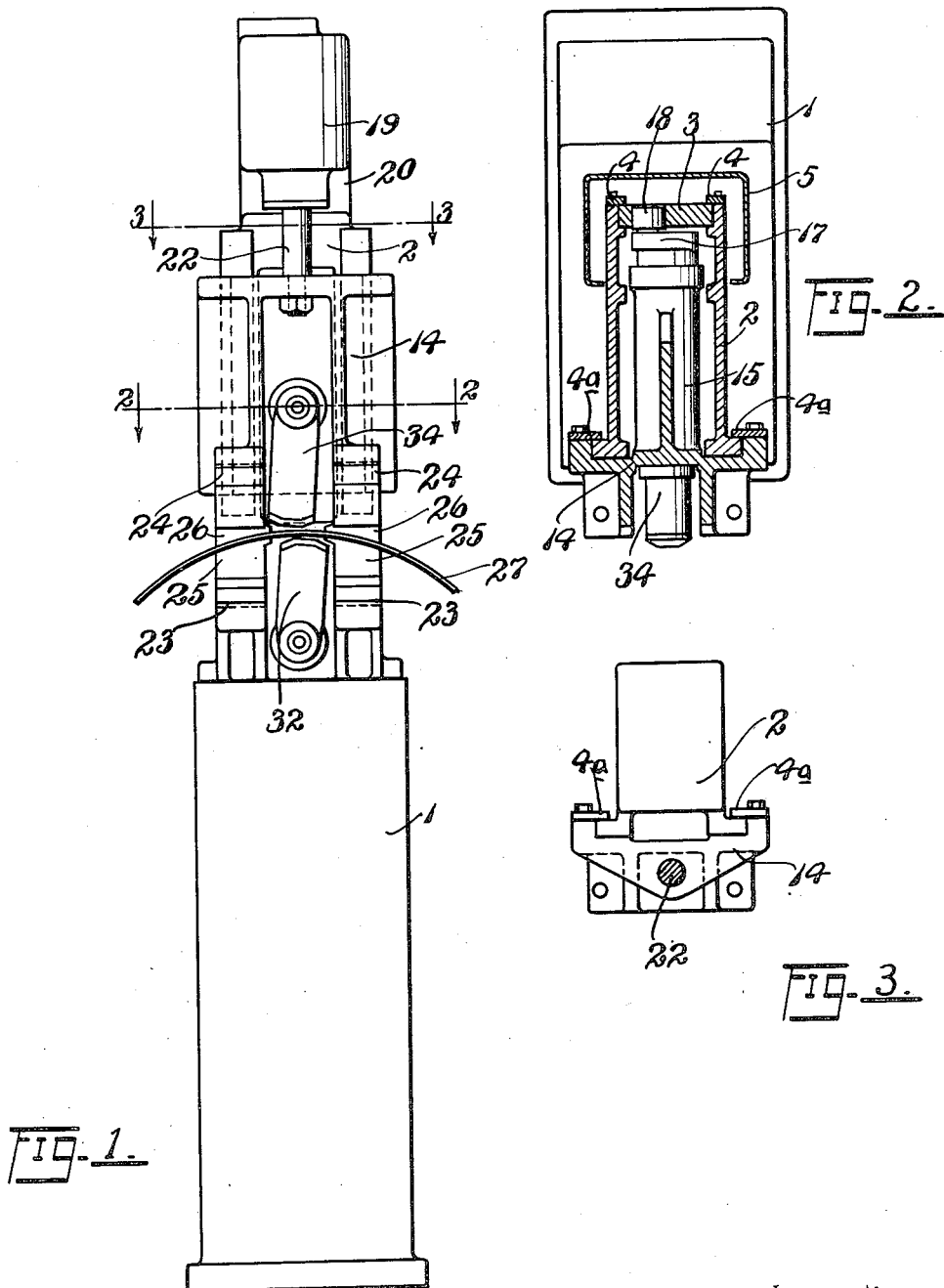

July 8, 1952  H. E. MORTON  2,602,378
FORMED STOCK FLASH REMOVING MACHINE
Filed May 22, 1948  5 Sheets-Sheet 3
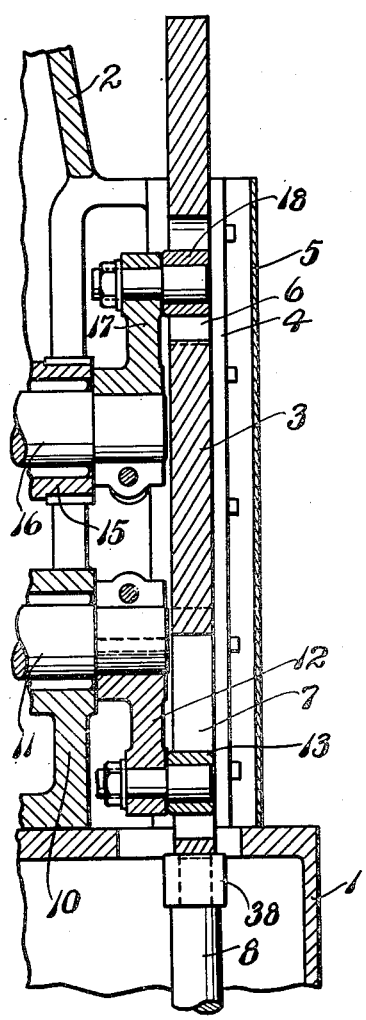
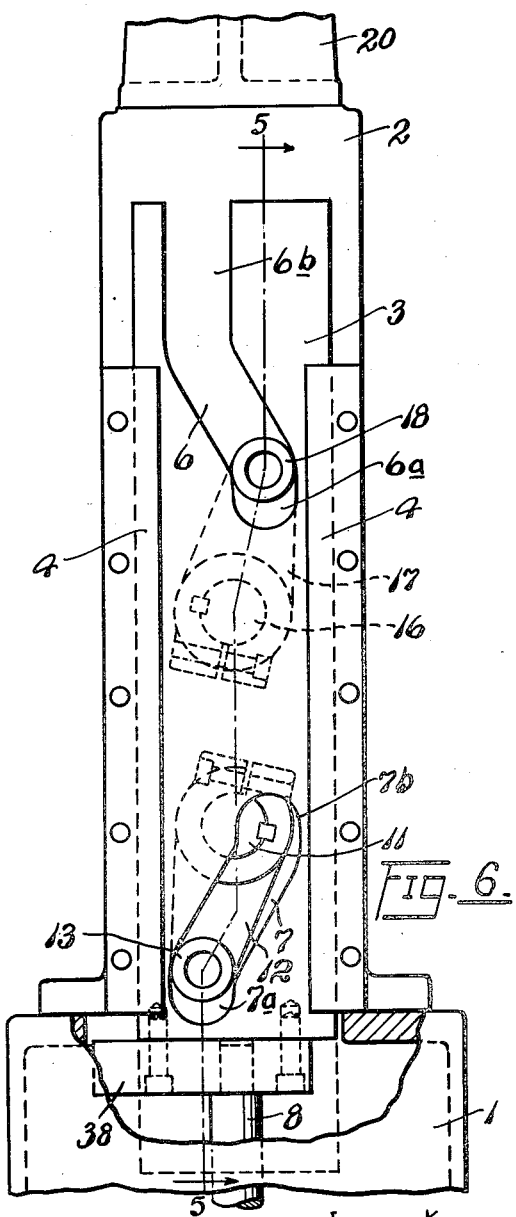
Inventor
Henry Earl Morton
By Liverance & Van Antwerp
Attorneys July 8, 1952 — H. E. MORTON — 2,602,378
FORMED STOCK FLASH REMOVING MACHINE
Filed May 22, 1948 — 5 Sheets-Sheet 4
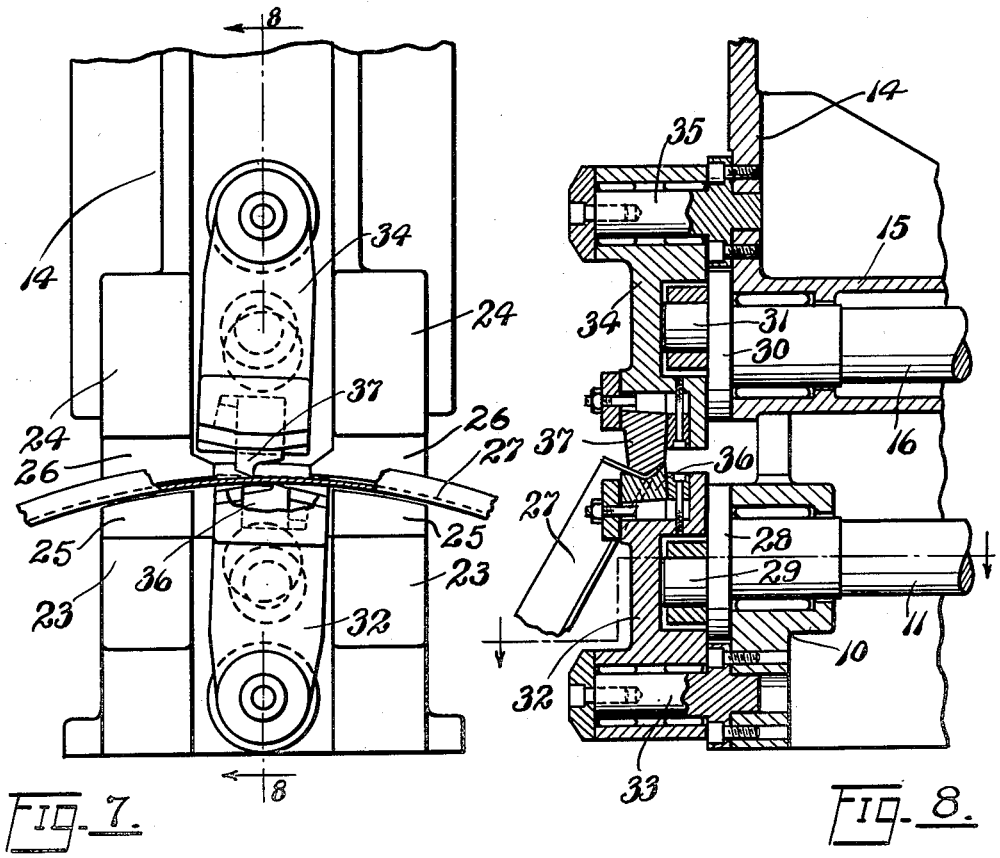
Fig. 7.   Fig. 8.
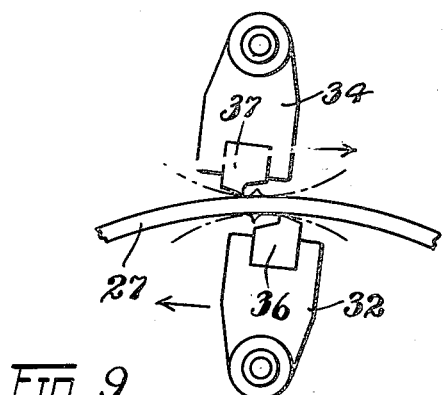 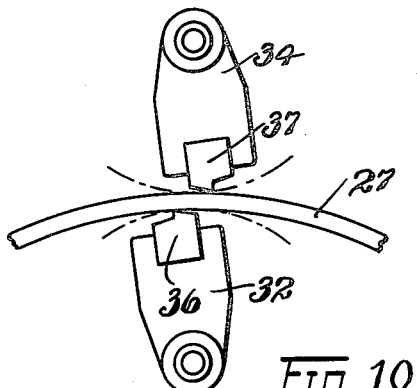
Fig. 9.   Fig. 10.
Inventor
Henry Earl Morton
By Liverance & Van Cuteverfs
Attorneys

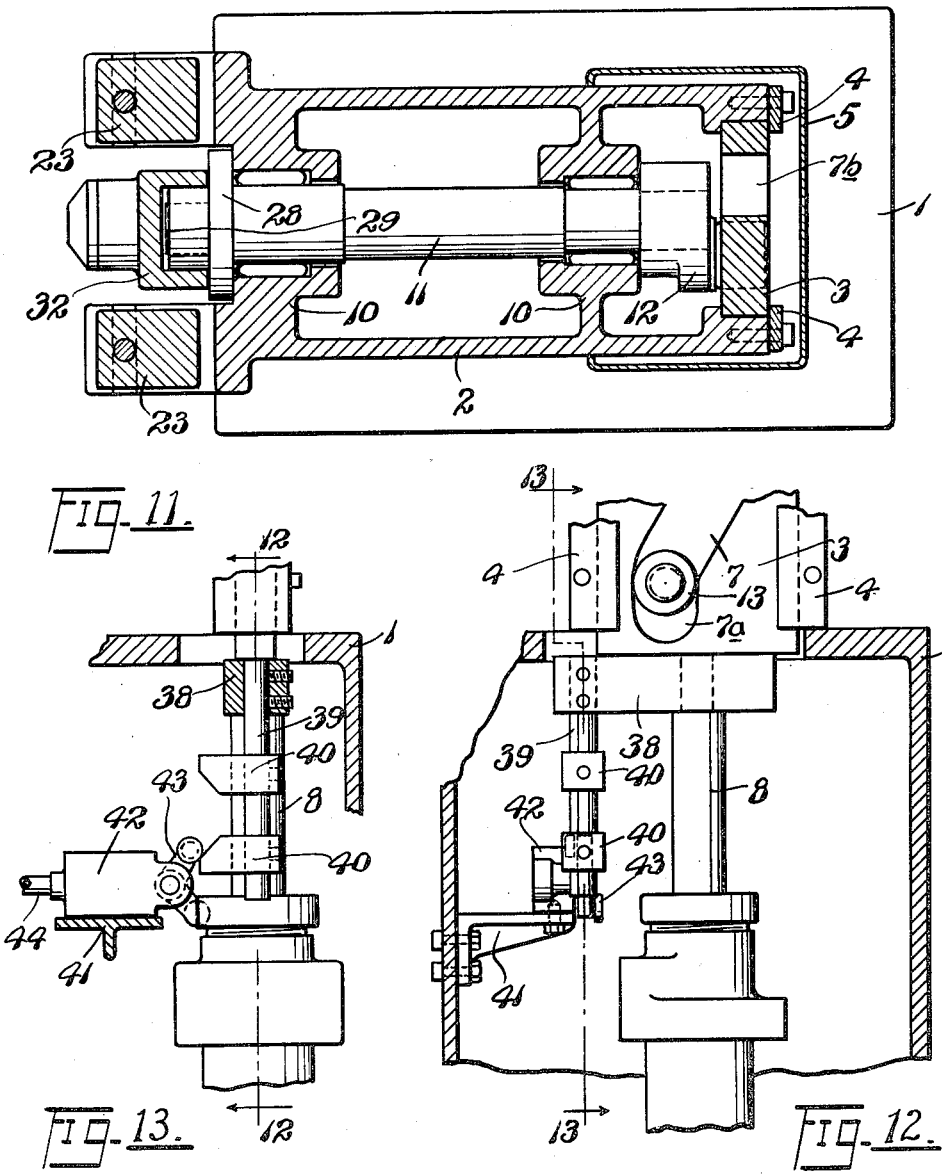

Patented July 8, 1952

2,602,378

UNITED STATES PATENT OFFICE 2,602,378

FORMED STOCK FLASH REMOVING MACHINE

Henry Earl Morton, Muskegon Heights, Mich.

Application May 22, 1948, Serial No. 28,637

11 Claims. (Cl. 90—24)

This invention relates to a novel and practical machine for machining away and removing the fins or ribs which are produced at the joint in butt welding the ends of a metal product of a curved form. Examples of the product may include the rims of bicycle wheels, or wherein any length of metal is shaped in circular form, its ends brought together and butt welded at such ends. In the operation of butt welding the metal adjacent the joint, being heated to a very high degree of temperature, is of a plastic or semi-fluid condition and when pressed together to make the weld, ribs or fins are made transversely across the wheel rim at the joint and project outwardly and also inwardly at opposite sides thereof. In practice such projecting fins or ribs are called, "flash," and the machine which I have invented will be known in the trade as a flash removing machine for such or similar formed stock. It is of course to be understood that the machine will be used in conjunction therewith, for removing such flash fins or ribs which come from welding as described, and in conjunction with many other formed articles, and particularly those which have a curved shape, whether circular, oval, elliptical or otherwise, or those wherein there is not a completely closed member, yet is of curved form.

It is a primary object and purpose of the present invention to provide a very practical and useful machine for such fin or rib flash removal, and by means of which the surfaces at the opposite sides of the welded member at the joint are machined smooth and in conformity with the adjacent surface portions outwardly and inwardly of which said flash fins or ribs extend before their removal. It is a further object and purpose of the invention to provide removable means for clamping and holding the pieces of work in succession, one after the other, and releasing for removal after processing has been done upon one of such articles, and placing the machine in condition for receiving the next article which is to be processed. A still further object of the invention is to provide a machine of the type noted which may be used in conjunction with various types of cross sections of welded members, the machine having means for releasably securing all the formed cutting tools necessary for use with the differing cross sections of work which is to have the flash fins or ribs machined and removed therefrom. A yet further object of the invention is to provide a machine which is sturdy and durable and of long life, and with which high quantity production is attained.

An understanding of the invention may be had from the following description, taken in connection with the accompanying drawings, in which:

Fig. 1 is a front elevation of the flash removal machine of my invention,

Figs. 2 and 3 are horizontal sections substantially on the planes of lines 2—2 and 3—3 of Fig. 1, Fig. 4 is a partial vertical section and side elevation of the machine, the upper portion of the machine being in vertical section from front to rear, Fig. 5 is a fragmentary enlarged vertical section, substantially on the plane of line 5—5 of Fig. 6, Fig. 6 is a fragmentary enlarged rear elevation of the machine shown in Figs. 1 and 4, showing the vertical reciprocating operating slide of the machine and its mounting, Fig. 7 is a fragmentary enlarged front elevation of the machine at the work entrance thereto, some parts being removed and shown in section for better disclosure, Fig. 8 is a vertical section substantially on the plane of line 8—8 of Fig. 7, Figs. 9 and 10 are elevations of the cutting tools of the machine and their mountings in two positions, one at the beginning and the other at the end of a flash removal operation, a fragmentary portion of the work being shown between them, Fig. 11 is a horizontal section, enlarged on the plane of line 11—11 of Fig. 4, Fig. 12 is a vertical section and elevation on the plane of line 12—12 of Fig. 13, and Fig. 13 is a vertical section and elevation on the plane of line 13—13 of Fig. 12, the sections of Figs. 12 and 13 being through the lower supporting base or stand of the machine, and illustrating the mechanism for controlling the reciprocating of the slide shown in Fig. 6.

Like reference characters refer to like parts in the different figures of the drawings, and the sections are taken looking in the directions indicated by the arrows.

In the construction of the machine shown in the drawings, a supporting base or pedestal 1, preferably of cast metal, has bolted or otherwise secured to it at its upper side, a vertical hollow housing 2. Said housing is open at its front and rear and at the rear has rearwardly extending parallel sides, between which a vertical slide 3 is mounted for reciprocation, being guided between guide ribs on the spaced sides of the housing 2 at the front, and vertical guide bars 4 connected at the rear vertical edges of said sides of the housing. The vertical slide bar 3 (Figs. 5 and 6) toward its upper end is slotted, having an intermediate slot portion 6 which is at an angle to the vertical, at the lower end of which is a short vertical closed extension 6a. At the upper end a longer vertical section 6b extends to the upper end of the slide. Towards its lower end a second slot is made having an intermediate section 7, inclined at an angle to the vertical but opposite to the inclination of the slot 6, and at the lower and upper ends, respectively, are short vertical closed branches 7a and 7b of the shape shown in Fig. 6. A piston rod 8 is connected at its upper end to the lower end of the slide 3, which at its lower end passes through an opening in the top of the pedestal 1. The piston rod extends into a cylinder 9 and is provided with a piston (not shown) within said cylinder. The alternate introduction of a pressure fluid, such as compressed air, to opposite sides of a piston within the cylinder 9 causes vertical reciprocatory movements of the slide 3.

Transverse partitions 10 cast with the housing 2, one at its front and the other toward its rear, have aligned horizontal journals therein, through which a horizontal shaft 11 extends. It is mounted for rocking movement in suitable bearings within the journals. At its rear end the shaft 11 is equipped with a downwardly extending arm 12, which at its lower end has a pin extending rearwardly therefrom into the slot 7, equipped with a roller 13 which is adapted to traverse said slot.

A bracket 14 has a front positioned vertically substantially over the front partition 10, and an integral sleeve 15 extending rearwardly therefrom a distance such that its rear end is substantially above the journal on the rear partition 10. Such bracket is mounted for vertical sliding movements on the housing 2 by means of vertical guides, including the retaining guide bars 4a, as shown in Fig. 2.

A shaft 16 is mounted for rocking movements in the sleeve 15. At its rear end it has an upwardly extending arm 17 which, like the arm 12, has a pin connected extending to the rear thereof on which is a roller 18 similar to the roller 13. The roller 18 rides in the slots 6 and its branches 6a and 6b. It is evident that on reciprocation of the slide bar 3 the shafts 11 and 16 are rocked about their longitudinal axes.

A vertical cylinder 19 is mounted on a supporting bracket 20 at and above the upper end of the housing 2 (Fig. 4). Within the cylinder is a piston 21 from which a piston rod 22 extends downwardly, through the lower head of the piston, and is securely connected with the upper end of the bracket 14. On movement of the piston 21 upwardly the bracket and the parts connected therewith are moved upwardly and on downward movement of the piston 21 they are moved in the opposite direction. The cylinder is adapted to receive compressed air or other fluid pressure at opposite sides of the piston.

At the front side of the housing 2 and at each side of the shaft 11, spaced forwardly extending bosses or projections 23 are cast. Similarly at the front side of the bracket 14 and near its lower end and at each side of the shaft 16, spaced forwardly extending projections or bosses 24 are cast with the bracket. To the lower bosses 23, under clamping jaws 25 (Fig. 1) are detachably secured. Other clamping jaws 26 are detachably secured to and extend below the lower ends of the upper bosses 24. Said jaws are shaped to conform to the inner and outer sides of a curved member 27, which may be of ring form, such as a bicycle wheel rim or any other similar structure, which in the operation of the machine is held and clamped between the pairs of spaced clamping jaws with the flash fins or ribs, produced in butt welding the ends of a length of metal where they are brought together when the metal is formed into circular form, located between the spaced pairs of jaws.

At the front end of the shaft 11 (Fig. 8), a disk 28 is located, welded or integral therewith, from which a pin 29 eccentrically mounted on the disk extends in a forward direction. The upper shaft 16, similarly, has a disk 30 with a forwardly extending pin 31 eccentrically located thereon. Such pins have rollers thereon and with said rollers are received in recesses in the rear sides of tool carrying arms which are swingably mounted upon the front partition 10 of the housing 2 and the bracket 14. The lower arm 32, in the rear side recess of which pin 29 and its roller extend, is mounted for rocking movement upon a forwardly extending stud 33 permanently connected to the front partition 10 of the housing 2 near its lower end, the arm 32 extending in an upward direction. An upper arm 34 is mounted for rocking movement on a like stud 35 secured to and extending forward from the bracket 14 above the shaft 16. The arm 34 extends downwardly. A cutting tool 36 is detachably secured at the upper end of the arm 32 and a cooperating cutting tool 37 is detachably connected to the lower end of the arm 34. The formation of the cutting edge portions of the cutting tools will correspond to the cross sectional shape of the curved ring or other member 27 from which the welding flash ribs or fins are to be machined.

It is evident that the reciprocation of the slide bar 3 with a consequent rocking of the shafts 11 and 16, will serve to swing the arms 32 in the opposed directions indicated by the arrows in Fig. 9, whereupon the ribs or fins produced at the welded joint of the ring 27 are cut away during such movements of the arms 32 and 34 and the cutting tools carried thereby, from the position shown in Fig. 9 to that in Fig. 10. The detachable securing of the cutters 36 and 37 to the arms 32 and 34 permits the selective use of properly designed cutters to correspond with the cross sectional shape of the rings or other curved members processed, and the jaws 25 and 26 are likewise detachably secured in place for the selective use of the proper clamping jaws.

On the piston rod 8 (Fig. 12) an arm 38 is secured and extends outwardly therefrom, to which a depending rod 39 is connected. On the rod 39, two spaced apart fingers 40 are secured which, moving with the rod 39 upon reciprocatory movements of the piston rod 8, are moved up and down simultaneously therewith.

A bracket 41 connected at the inner side of the pedestal 1 has mounted thereon a valve housing 42 with valve mechanism therein which is controlled by the rocking movement of a bell crank lever 43 mounted on said housing, the arms of which are offset and one of which is engaged by the upper finger 40 and the other by the lower to operate the valve mechanism within the housing 42. Such valve mechanism controls the direction of flow of compressed air or other fluid pressure to opposite ends of the cylinder 9 above and below the piston therein. Thus when the slide is in its lowermost position, as in Figs. 5, 6, 12 and 13, the upper arm of the bell crank lever 43 has been turned counterclockwise to the position shown in Fig. 13. On upward movement of the slide 3 caused by the upward movement of the rod 8, the other finger 40 engages with the lower arm of the bell crank 43, turning said bell crank clockwise. In this manner the automatic reversal of movement of the slide 3 is accomplished. The automatic control of the flow of pressure fluid to above and below the piston 21 is for raising and lowering the bracket 14 and the parts carried thereon.

In the operation, the bracket 14, the upper cutter 37 and its carrying arm are in elevated position when the work 27 is put in place. In such elevated position of the bracket, the roller 18 will be in the branch slot 6b and the roller 13 in the upper shorter and closed branch slot 7b. Introduction of compressed air into the upper end of the piston 19 moves the bracket 14, the clamps 26 carried thereby, and the cutter carrying arm 34 downwardly so that the ring 27, upon which the welding flash fin or rib is located, is clamped and held against movement. The flow of compressed air or equivalent pressure fluid into the upper end of cylinder 9 will thereupon cause a downward movement of the slide, rocking the shafts 16 and 11 as the rollers 18 and 13 traverse the inclined slots 6 and 7, thereupon moving the arm 34 and its cutter 37 to the right (Fig. 9) and the lower arm 32 and its cutter 36 to the left, as indicated by the arrows. The sharp cutting edges of the cutters following the inner and outer surfaces of the ring 27, or other similar curved member, machine the welding flash ribs or fins from said surfaces, which thereupon become continuous with the smooth inner and outer surfaces of said member 27.

At the completion of the upward movement of the operating slide 3, the reversal of the piston within the cylinder 9, as previously described, results in said slide returning to its lower position with the roller 18 in the lower part of the upper branch slot 6b in a position such that it may move upwardly in the branch slot when the bracket 14 and connected parts are elevated by reversing the pressure in cylinder 19 to release the processed work, thereby putting the machine in a condition for removing the processed work and replacing it by another ring, which is to have the welding flash fins or ribs cut therefrom.

The control of the flow of compressed air to start the machine in operation may be a manual control worked by the machine operator, but with an automatic return of the slide 3 to its initial position after a curved member has been processed to remove the welding flash ribs or fins thereon. The air control for the cylinder 19 in practice is also of an automatic character.

The machine described is very practical and useful and is in operation. One important feature of construction in connection with the machine is that the cutters carried on the pivotally mounted arms 32 and 34 are always in the same relation to the clamping jaws which clamp the work between them, and the two move in a direction toward or away from the work simultaneously and in equal amounts. This creates a condition such that variations in thickness of the stock of the work does not change the relation between the cutters and the flash material which is removed, so that in all stock thickness variations, the trimming of the joint at the weld has the same closeness of setting and does not change with changes in the thickness of the stock material. Also with this machine, the trimming of thin materials, in which it is very important to support the welded seam as close to the weld line as possible, is very successfully attained. Previously cutters for the flash projections or ribs at a butt weld, using rotating cutters or trimmers on a fixed center, required that the diameter of the rotating cutter be made as small as possible, whereupon the arc of cut was short and the cutting or trimming was hard to obtain successfully, and particularly with variations in material thickness. Other forms of flash trimming included a short straight line motion of the cutting tools across the welded seam, and this on cylindrical or circular work is impractical. With my invention the work may be supported closely to the welded seam and the cutters swept across said seam, the inner cutter in the arc of a circle curved in the same direction as the curved work, and the outer cutter curved in the opposite direction but with a short stroke or small angle of movement, through an arc of movement having a relatively long radius.

The invention is defined in the appended claims and is to be considered comprehensive of all forms of structure coming within their scope.

I claim:

1. In a machine of the class described, a support, including two spaced apart supporting members, upon which a curved member having a butt weld extending transversely to the member is adapted to be located with said weld between said supporting members, a movable member mounted for vertical movements above said support members having two spaced apart clamping members one over each of said spaced supporting members adapted in the lower position of said movable member to clamp against said butt welded member, a cutting member pivotally mounted for swinging movement between said spaced supporting members having a cutter below said butt welded member, a second cutting member pivotally mounted for swinging movement on said vertically movable member between said spaced apart clamping members over the first cutting member and adapted to be located over the welded member between them, and means for simultaneously moving said cutting members to cut butt weld flash ribs or fins from said butt welded member at the weld therein.

2. A structure as defined in claim 1, and means for raising and lowering said vertically movable member and the cutter and clamping members thereon carried thereby, whereby a butt welded member is adapted to be entered between said cutting members when said vertically movable member is in upper position, and be clamped on downward movement thereof, as specified.

3. A structure as defined in claim 1, each of said cutting members comprising, a generally vertically positioned arm, horizontal shafts to which said arms are connected, the lower arm extending upwardly from said shaft and the upper arm extending downwardly from its shaft, and means for rocking said arms simultaneously in opposite directions, said arms at their free ends having cutters thereon adapted to move, respectively, at the inner and outer sides of a curved butt welded member having the weld thereof disposed between said cutting members.

4. In a machine of the class described, a supporting pedestal, a housing secured to and extending upwardly from said pedestal, a horizontal shaft mounted on said housing, a bracket slidably mounted on said housing at the front side thereof for vertical movements, a second horizontal shaft above the first shaft mounted on said bracket, horizontal spaced clamping jaws on said housing at the front thereof between said shafts, horizontal spaced clamping jaws on said bracket over said first mentioned jaws, said clamping jaws being disposed one at each side of the axis of its adjacent shaft, movably mounted cutting members, one mounted on the shaft mounted on said housing between said clamping jaws and one on the shaft mounted on said bracket between the clamping jaws thereon, means for moving said cutting members upon rocking movement of said shafts, and means for simultaneously rocking said shafts.

5. A structure as defined in claim 4, a cylinder mounted on said housing above the bracket, a piston within said cylinder, and a rod connecting the piston and bracket, means for introducing fluid pressure into said cylinder, movement of said piston upwardly elevating said bracket, and movement downwardly thereof moving the bracket downwardly, whereby work to be processed by said cutting members may be clamped between said jaws.

6. A structure as defined in claim 4, said means for rocking said shafts simultaneously comprising a vertical slide having spaced slots one over the other in the length thereof, said slots being inclined to the vertical, an arm connected at the rear end of each shaft, a pin extending from the free end of each arm rearwardly into said slots of said vertical slide, and means for reciprocating said slide.

7. In a machine of the class described, a lower support, two spaced clamping jaws carried at the upper end of the support, an arm adapted to have a cutter secured thereto at its upper end, pivotally mounted at its lower end on said support for the cutter to swing between said jaws, an upper support, a member slidable vertically thereon, two spaced clamping jaws carried at the lower end of said member over the first mentioned clamping jaws, said upper and lower jaws being adapted to clamp curved work between the jaws, an arm pivotally mounted at its upper end on said support and extending downwardly between said upper jaws adapted to have a cutter secured at its lower end, means for rocking said arms, and means for raising and lowering said slidable member and attached jaws and upper arm mounted thereon.

8. A construction as defined in claim 7, said means for raising and lowering said member comprising a piston cylinder apparatus having a piston rod connected with said member whereby work of different thicknesses may be clamped between said jaws, and said jaws and cutter arm carried by the member maintain the same relation to each other in all positions.

9. In a machine of the class described, a lower pair of clamping jaws, said jaws being spaced from each other, an upper pair of spaced clamping jaws over the lower jaws, means for mounting one of said pairs of jaws for movement toward or away from the other, pivotally mounted cutter means mounted to swing between each pair of jaws, the cutter means associated with the movable jaws being movable simultaneously with said jaws in the same direction therewith, and means for moving said cutter means about their pivots.

10. The elements of claim 9 combined with means for adjusting each cutter means relative to its respective jaws.

11. The elements of claim 9 in which the radius of the arc of movement of said cutters is considerably greater than the distance between the jaws of a pair.

HENRY EARL MORTON.

REFERENCES CITED

The following references are of record in the file of this patent:

UNITED STATES PATENTS

| Number | Name | Date |
|---|---|---|
| 1,117,663 | Gressle | Nov. 17, 1914 |
| 1,493,483 | Edwards | May 13, 1924 |
| 1,854,522 | Morton | Apr. 19, 1932 |
| 2,386,451 | Ellis | Oct. 9, 1945 |